(12) United States Patent
Shen et al.

(10) Patent No.: US 10,829,158 B2
(45) Date of Patent: Nov. 10, 2020

(54) AUTOMOBILE SYSTEMS FOR MOVEMENT OF AUTOMOBILE COMPONENTS

(71) Applicants: Joe G Shen, Elmhurst, NY (US);
Winifred Shen, Elmhurst, NY (US)

(72) Inventors: Joe G Shen, Elmhurst, NY (US);
Winifred Shen, Elmhurst, NY (US)

(*) Notice: Subject to any disclaimer, the term of this patent is extended or adjusted under 35 U.S.C. 154(b) by 178 days.

(21) Appl. No.: 16/199,203

(22) Filed: Nov. 25, 2018

(65) Prior Publication Data
US 2019/0161123 A1  May 30, 2019

Related U.S. Application Data

(60) Provisional application No. 62/593,193, filed on Nov. 30, 2017.

(51) Int. Cl.
*B62D 25/02* (2006.01)
*B62D 37/02* (2006.01)
*B62D 35/00* (2006.01)

(52) U.S. Cl.
CPC ......... *B62D 25/025* (2013.01); *B62D 35/008* (2013.01); *B62D 37/02* (2013.01)

(58) Field of Classification Search
CPC .. B62D 25/025; B62D 35/005; B62D 35/008; B62D 37/02
See application file for complete search history.

(56) References Cited

U.S. PATENT DOCUMENTS

| | | | | |
|---|---|---|---|---|
| 4,159,140 A | * | 6/1979 | Chabot | B62D 35/005 296/180.5 |
| 4,582,351 A | * | 4/1986 | Edwards | B60R 19/56 293/102 |
| 4,902,067 A | * | 2/1990 | Sakai | B62D 35/005 296/180.1 |
| 5,458,391 A | * | 10/1995 | Ito | B62D 35/005 296/180.1 |
| 7,686,382 B2 | * | 3/2010 | Rober | B62D 37/02 296/180.1 |
| 8,702,152 B1 | * | 4/2014 | Platto | B62D 37/02 296/180.1 |

(Continued)

FOREIGN PATENT DOCUMENTS

| | | | | |
|---|---|---|---|---|
| DE | 3613301 A1 | * | 10/1987 | ........... B62D 35/008 |
| DE | 202011005504 U1 | * | 10/2011 | ........... B62D 35/008 |

(Continued)

OTHER PUBLICATIONS

Machine translation of DE-3613301-A1 (Year: 1987).*
Machine translation of JP-59156875-A (Year: 1984).*

*Primary Examiner* — Michael McCullough (57) ABSTRACT

A skirt system for an automobile includes first and second side skirts and a driver assembly. The automobile has a frame including a first side sill and a second side sill. The first side skirt couples to the first side sill and the second side skirt couples to the second side sill. The side skirts are selectively movable relative to the side sills between a first position and a second position. The driver assembly is actuatable to move the side skirts between the first and second positions. The side skirts may be extendable. The side skirts may include an electrical charger. The automobile can include a front quarter that can be moved between raised and lowered positions.

2 Claims, 6 Drawing Sheets

(56) References Cited

U.S. PATENT DOCUMENTS

| | | | | |
|---|---|---|---|---|
| 8,887,845 B2* | 11/2014 | McDonald | ............ | B62D 35/005 |
| | | | | 180/68.1 |
| 9,481,396 B2* | 11/2016 | Jachowski | ............ | B62D 35/008 |
| 9,731,777 B2* | 8/2017 | Yoon | .................... | B62D 35/005 |
| 9,783,153 B2* | 10/2017 | Farooq | .................. | B60R 19/023 |
| 9,975,490 B1* | 5/2018 | Ozog | ........................ | B60R 3/02 |
| 9,994,267 B1* | 6/2018 | Marmo | ................ | B62D 35/008 |
| 10,189,517 B2* | 1/2019 | Povinelli | ............... | B62D 37/02 |
| 10,227,095 B2* | 3/2019 | Gaylard | ............... | B62D 35/008 |
| 10,315,579 B2* | 6/2019 | Gaylard | ............... | B62D 37/02 |
| 10,457,340 B2* | 10/2019 | Potvin | ................... | B62D 37/02 |
| 2007/0216194 A1* | 9/2007 | Rober | ................... | B62D 37/02 |
| | | | | 296/180.1 |
| 2016/0244107 A1* | 8/2016 | Ishiba | .................. | B62D 35/008 |
| 2020/0039587 A1* | 2/2020 | Bradley | ............... | B62D 35/008 |

FOREIGN PATENT DOCUMENTS

| | | | | | |
|---|---|---|---|---|---|
| FR | 2983451 A1 | * | 6/2013 | ........... | B62D 35/007 |
| FR | 3069836 A1 | * | 2/2019 | ........... | B62D 37/02 |
| JP | 59156875 A | * | 9/1984 | ........... | B62D 35/005 |

\* cited by examiner

AUTOMOBILE SYSTEMS FOR MOVEMENT OF AUTOMOBILE COMPONENTS

TECHNICAL FIELD

The present disclosure relates to automobiles, and more particularly, to devices, systems and methods for moving automobile components of an automobile relative to the automobile.

BACKGROUND

Low profile automobiles, such as sports cars, are designed to have aerodynamic bodies that facilitate air flow around the automobile and to improve energy efficiency of the automobile. Typically, these aerodynamic bodies are necessarily designed to be disposed in close proximity to the ground to achieve optimal aerodynamic results. While such designs help to lower drag for increasing speed and acceleration, these designs also increase the likelihood that the bodies of these automobiles will strike the ground as the automobile travels onto a steep slope or over a pothole, damaging the automobile body. In addition, while low profile automobiles are often driven at high speeds, there is increased likelihood that such automobiles can be subject to increased roll-over rates, particularly around sharp and/or elevated turns.

SUMMARY

Accordingly, there is a need to provide a method, system, and/or apparatus that can selectively increase ground clearance for an automobile, improve air flow about the automobile, limit roll-over rates, and/or facilitate energy efficiencies of the automobile.

In accordance with one aspect of the present disclosure, a skirt system for an automobile is provided. The automobile has a frame including a first side sill and a second side sill. The skirt system includes a first side skirt that couples to the first side sill of the automobile. The first side skirt is selectively movable relative to the first side sill between a first position and a second position. The skirt system includes a driver assembly that couples to the frame of the automobile and to the first side skirt. The driver assembly is actuatable to move the first side skirt between the first and second positions.

In some embodiments, the first side skirt may pivotably couple to the first side sill.

In certain embodiments, the driver assembly may include a first arm assembly. The first arm assembly includes a first arm that couples to the first side sill and a second arm that couples to the first side skirt. One or both of the first and second arms may be movable relative to the other of the first and second arms to move the first side skirt relative to the first side sill. The first and second arms may be coupled together.

In embodiments, the first side skirt may include a plurality of panels. The plurality of panels may include a first panel and a second panel that are coupled together. The second panel is movable relative to the first panel to move the first side skirt between an unexpanded position and an expanded position. The first side skirt is positioned to extend farther from the first side sill when the second panel is disposed in the expanded position. The second panel may support a charger that is configured to electrically couple to an energy storage device of the automobile. The charger may be positioned to receive energy from an independent energy source when the first side skirt is disposed in the expanded position and prevented from receiving energy from the independent energy source when the first side skirt is disposed in the unexpanded position.

In some embodiments, the skirt system may further include a second side skirt that couples to the second side sill of the automobile. The second side skirt may be selectively movable relative to the second side sill between a first and a second position. The driver assembly may be coupled to the first and the second side skirts. The driver assembly may be configured to move the first and second side skirts independently of one another, dependent of one another, or combinations thereof.

In certain embodiments, the driver assembly may be configured to move one or both of the first and second side skirts between respective first and second positions thereof in response to changes in one or more of steering, speed, tilt, or acceleration of the automobile.

In some embodiments, the first side skirt may depend from the first side sill in the first position and may extend in parallel with the first side sill in the second position.

In embodiments, the driver assembly may include a motor that is coupled to the first arm assembly and may be configured to move one or both of the first and second arms of the first arm assembly when the driver assembly is actuated.

In some embodiments, the driver assembly may be manually actuatable.

In one aspect of the present disclosure, an automobile with the skirt system includes a front quarter assembly coupled to a front bumper of the frame. The front quarter assembly may be selectively movable relative to the front bumper of the frame between a lowered position and a raised position to selectively change an amount of ground clearance from a bottom surface of a front quarter of the automobile. The front quarter assembly may include a lift beam. The lift beam may be coupled to the front bumper of the frame and to a front quarter body portion of the automobile. The lift beam may be coupled to an elevator system that selectively raises and lowers the lift beam relative to the front bumper of the frame in response to actuation of the elevator system. The elevator system may include a cable coupled to the lift beam. The cable may be coupled to a motor configured to selectively translate the cable to slide the lift beam along the front bumper of the frame.

In some embodiments, the front bumper of the frame may include a first stabilizer and a second stabilizer. The first and second stabilizers may be positioned to slidably support the lift beam between the first and second stabilizers.

In certain embodiments, the driver assembly may be selectively slidable relative to the frame.

According to yet another aspect of the present disclosure, an automobile includes a frame, an aerodynamic body supported on the frame, a side skirt coupled to the aerodynamic body, and a driver assembly. The side skirt is selectively pivotable relative to the aerodynamic body between first and second positions to control air flow about the aerodynamic body. The first and second positions define a pivot angle ninety degrees or more. The driver assembly is coupled to the side skirt and actuatable to pivot the side skirt between the first and second positions.

Other aspects, features, and advantages will be apparent from the description, the drawings, and the claims that follow.

BRIEF DESCRIPTION OF THE DRAWINGS

The accompanying drawings, which are incorporated in and constitute a part of this specification, illustrate embodiments of the presently disclosed dexterity testing apparatus and, together with a general description of the disclosure given above, and the detailed description of the embodiment(s) given below, serve to explain the principles of the disclosure.

DETAILED DESCRIPTION

Embodiments of the present disclosure are described in detail with reference to the drawings, in which like reference numerals designate identical or corresponding elements in each of the several views. Further, terms used herein such as "top," "bottom," "side" and similar directional terms are used simply for convenience of description and are not intended to limit the disclosure.

In the following description, well-known functions or constructions are not described in detail to avoid obscuring the present disclosure in unnecessary detail.

Figure 1A:
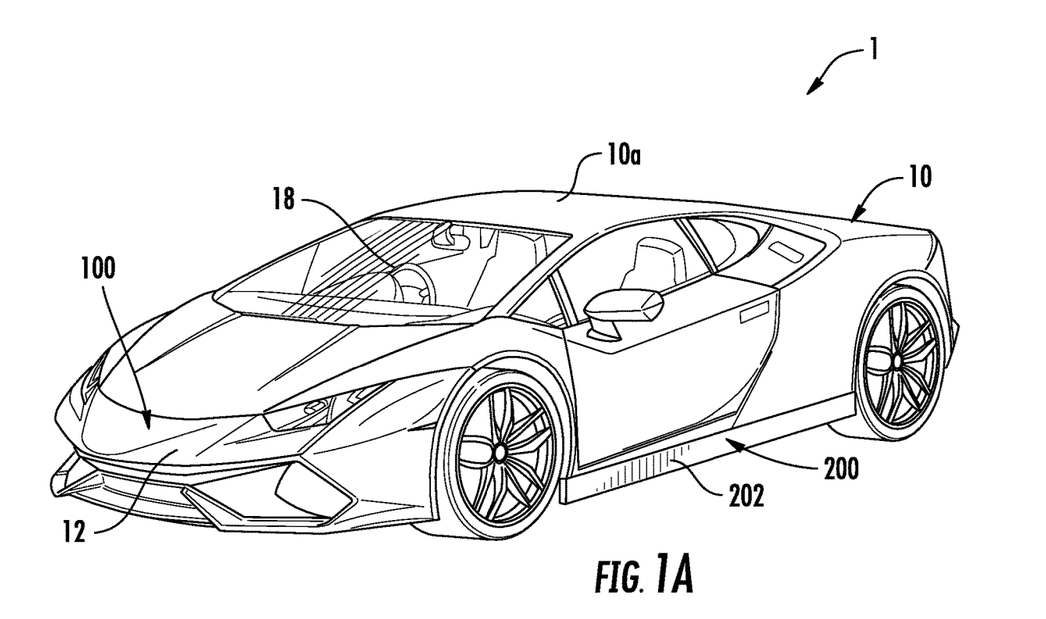
FIG. 1A is a front, perspective view of one embodiment of an automobile system in accordance with the principles of the present disclosure, the automobile system including a front quarter assembly and a skirt assembly shown in first lowered positions thereof, respectively.
Figure 1B:
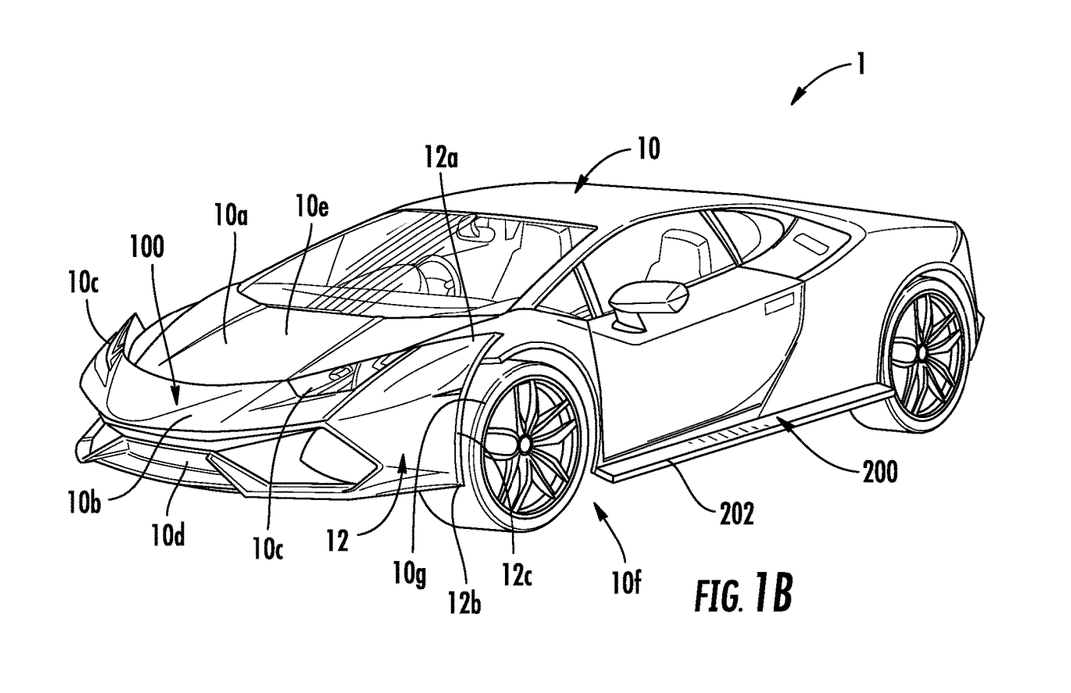
FIG. 1B is a front, perspective view of the automobile system of FIG. 1A with the front quarter assembly and the skirt assembly shown in second raised positions thereof, respectively.

Referring now to FIGS. 1A and 1B, one embodiment of an automobile system is generally referred to as 1. Automobile system 1 includes an automobile 10 having a front quarter assembly 100 and a skirt system 200 that includes a pair of skirt assemblies 200a, 200b (see FIG. 2B) disposed opposite sides of automobile 10.

Figure 2A:
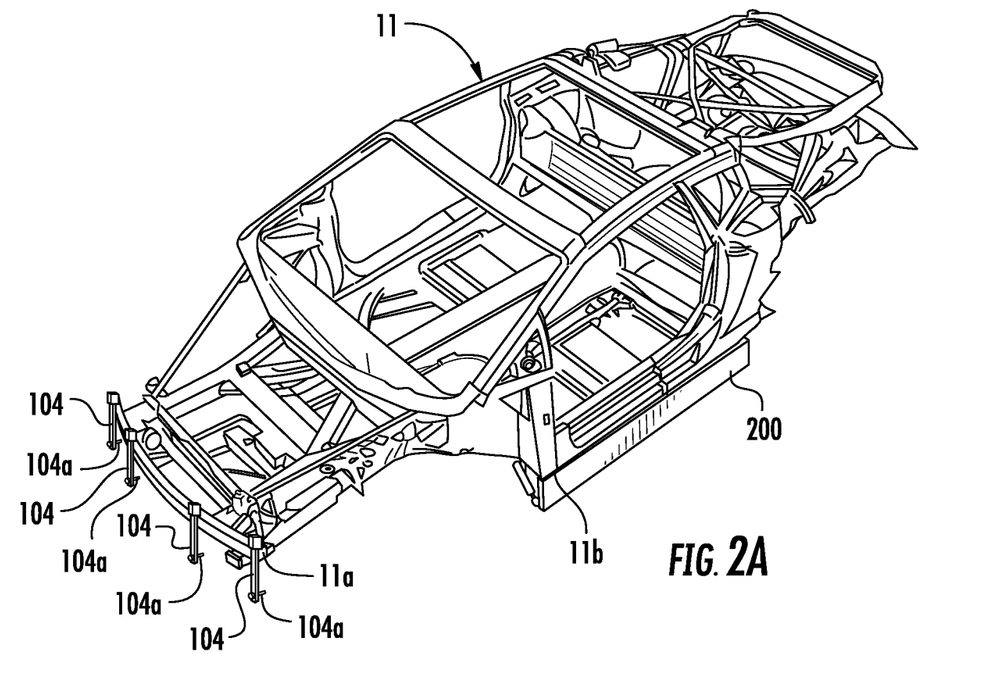
FIG. 2A is a front, perspective view of the automobile system of FIGS. 1A and 1B with portions thereof removed for clarity, the front quarter assembly and a skirt assembly shown in the first lowered positions thereof, respectively.
Figure 2B:
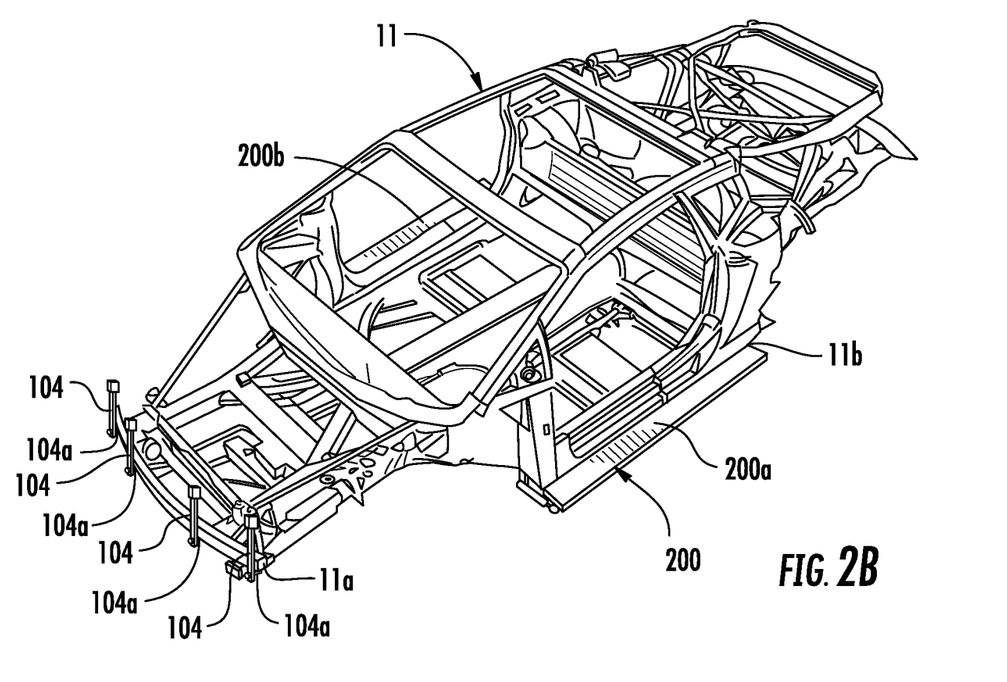
FIG. 2B is a front, perspective view of the automobile system of FIGS. 1A and 1B with portions thereof removed for clarity, the front quarter assembly and a skirt assembly shown in the second raised positions thereof, respectively.
Figure 3A:
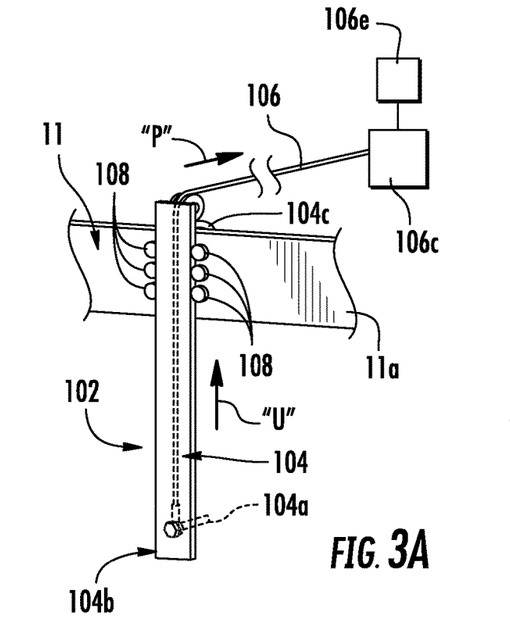
FIG. 3A is an enlarged, front, perspective view of a displacement mechanism of the front quarter assembly of the automobile system of FIGS. 1A and 1B, the displacement mechanism illustrated in a first lowered position thereof.
Figure 3B:
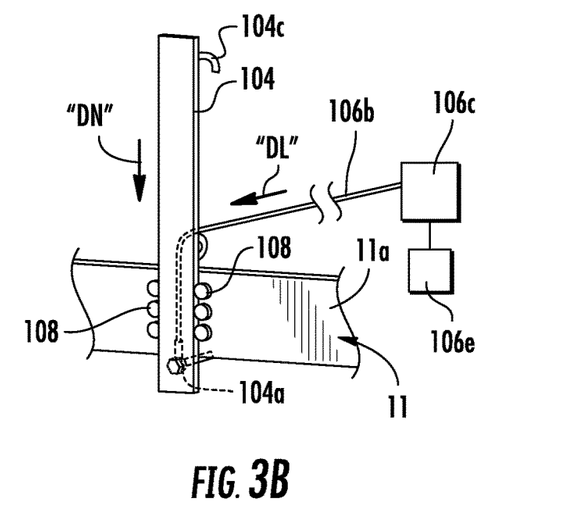
FIG. 3B is a front, perspective view of the displacement mechanism of FIG. 3A shown in a second raised position thereof.
Figure 4:
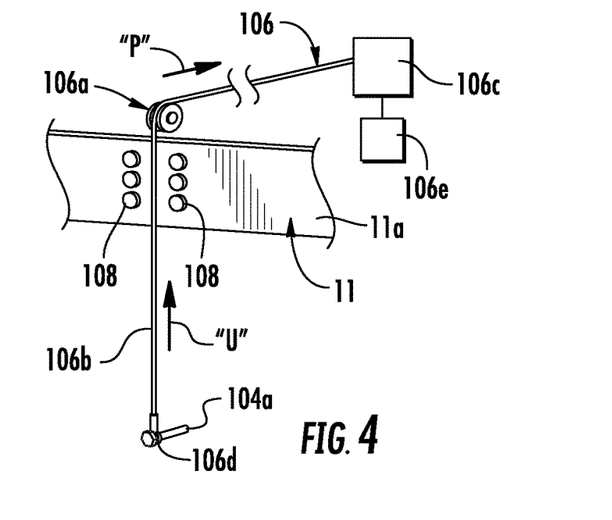
FIG. 4 is a front, perspective view of the displacement mechanism of FIG. 3A with a beam thereof removed for clarity.

With reference to FIGS. 1A-3B, front quarter assembly 100 of automobile system 1 includes a front quarter 12 of a body 10a of automobile 10 and a displacement mechanism 102 (FIG. 3A). Displacement mechanism 102 is configured to selectively move front quarter 12 of body 10a of automobile 10 relative to a front cross member or bumper 11a (see FIG. 2A) of a frame 11 of automobile 10 between a first lowered position (FIGS. 1A and 2A) and a second raised position (FIGS. 1B and 2B) to provide increased ground clearance for front quarter 12. Front quarter 12 of automobile 10 may include various parts of body 10a of automobile 10 including at least portions of a fascia 10b, a headlight 10c, a grill 10d, etc., or combinations thereof. Additionally and/or alternatively, front quarter 12 may include at least portions of a quarter panel, a header panel, valence, a front spoiler, etc., or combinations thereof, of automobile 10. In general, front quarter 12 includes a top surface 12a positioned adjacent a hood 10e of body 10a, a bottom surface 12b positioned adjacent to ground, and side surfaces 12c that extend between top and bottom surfaces 12a, 12b and are adjacent front wheels 10g of automobile 10. Side surfaces 12 may form part of a wheel well 10f of body 10a of automobile 10.

With reference to FIGS. 2A, 2B, 3A and 3B, displacement mechanism 102 of front quarter assembly 100 includes one or more lift beams 104 and one or more elevator assemblies 106 coupled to the one or more lift beams 104 to vertically translate lift beams 104 relative to frame 11 of automobile 10 between raised and lowered positions. Lift beams 104 are fixedly secured to front quarter 12 of automobile 10 to enable front quarter 12 to move relative to frame 11 in response to vertical translation of lift beams 104. Each lift beam 104 supports a lower stopper or finger 104a (e.g., a bolt) on a lower end portion thereof that couples to elevator assembly 106 and functions to limit raising or upward movement of lift beam 104 relative to bumper 11a when finger 104a engages bumper 11a. Each lift beam 104 defines side channels 104b in side surfaces of lift beam 104 and includes an upper stopper 104c (e.g., hook-shaped or any other suitable shape such as a block or the like) on an upper end portion of lift beam 104 that is configured to engage a top surface of front bumper 11a of frame 11 to limit lowering movement of lift beam 104 relative to front bumper 11a. Displacement mechanism 102 further includes stabilizers 108 (e.g., wheels) secured to front bumper 11a that are received within side channels 104b of lift beam 104 to slidably support lift beam 104 on front bumper 11a to enable lift beam 104 to move between a lowered position (FIG. 2A) and a raised position (FIG. 2B). Stabilizers 108 may be rotatably or non-rotatably mounted to front bumper 11a to help retain lift beam 104 in a vertical orientation against front bumper 11a. Elevator assembly 106 includes a pulley 106a secured to front bumper 11a (and/or to frame 11 and/or body 10a), a cable 106b mounted to pulley 106a, and a motor 106c secured to a proximal end portion of cable 106b. Cable 106b (e.g., steel wire, chain, etc.) extends distally to a socket 106d (e.g., a closed swage socket) that is coupled to finger 104a of lift beam 104. Motor 106c is selectively actuatable to translate cable 106b (e.g., tension and/or release) in proximal and/or distal directions, as indicated by arrows "P" and "DL," respectively, so that lift beam 104 can move upwards and/or downwards, as indicated by arrows "U" and "DN," respectively. Motor 106c can be coupled to a controller 106e (e.g., a controller, processor, etc.) that may be manually and/or autonomously activated to actuate motor 106*c* for effectuating translation of cable 106*b*.

In use, motor 106*c* is actuated to draw cable 106*b* in the proximal direction "P" (e.g., increase cable tension) to thereby slidably raise lift beam 104 relative to front bumper 11*a* so that lift beam 104 raises front quarter 12 away from the ground to a raised position (FIG. 1B) to increase ground clearance. With front quarter 12 disposed in a raised position, automobile 10 can then be driven over undesirable terrain, for example, a bump or steep slope, with greater ground clearance adjacent the front quarter 12 to reduce the likelihood of undesired impact of the front quarter 12 with the undesirable terrain. Once passed the undesirable terrain, motor 106*c* can then be actuated to release tension in cable 106*b* so that cable 106*b* translates in the distal direction "DL" to lower lift beam 104, thereby lowering front quarter 12 back to its lowered or initial position (FIG. 1A).

With reference again to FIGS. 1A-2B, similar to front quarter assembly 100 of automobile 10, each skirt assembly of the pair of skirt assemblies 200*a*, 200*b* of automobile 10 is selectively movable relative to frame 11 of automobile 10 between a first lowered position (FIG. 1A) and a second raised position (FIG. 1B) to provide increased ground clearance and/or to change air flow direction about automobile 10. Skirt assembly 200*a* and skirt assembly 200*b* are disposed in mirrored relationship on opposite sides of automobile 10, but are otherwise identical. In the interest of brevity, only skirt assembly 200*a* is described in detail.

Figure 5A:
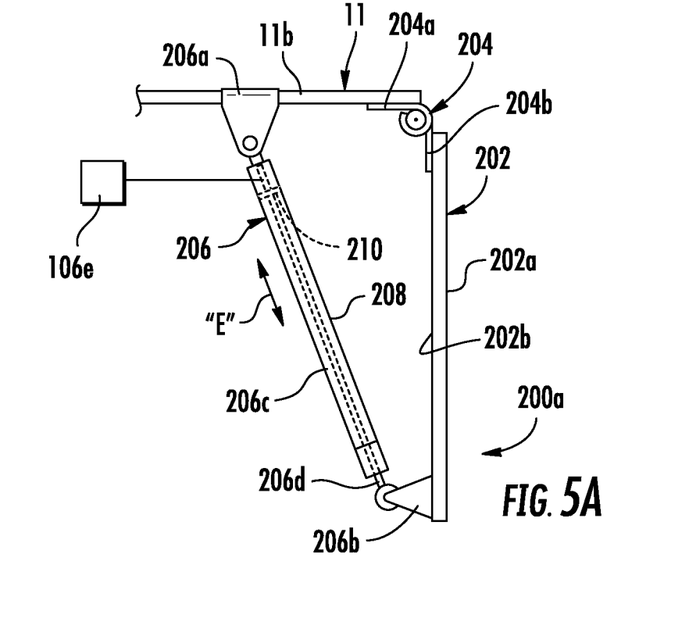
FIG. 5A is an enlarged, front view of the skirt assembly of the automobile system of FIGS. 1A and 1B, the skirt assembly shown in the first position thereof.
Figure 5B:
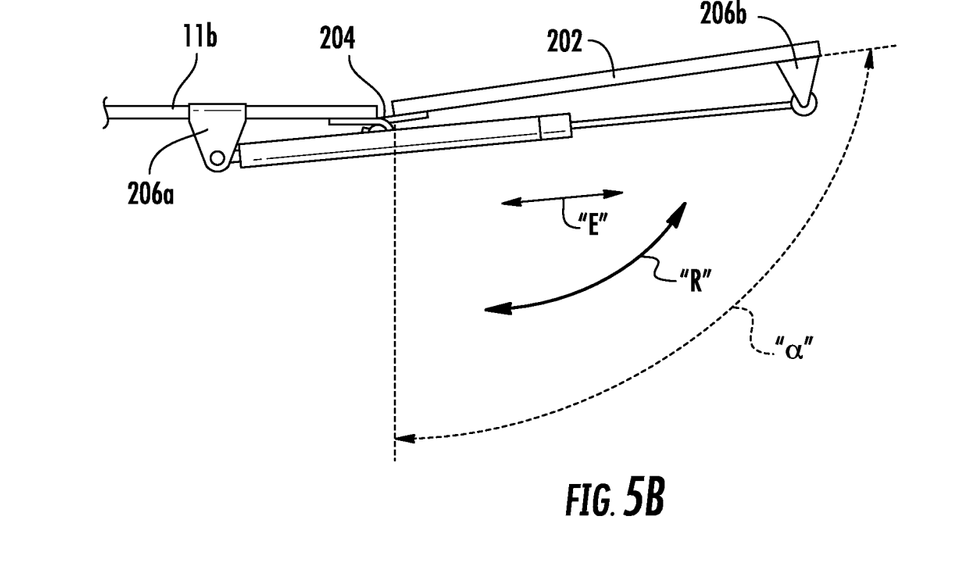
FIG. 5B is a front view of the skirt assembly of FIG. 5A with the skirt assembly shown in the second position thereof.

With reference also to FIGS. 5A and 5B, skirt assembly 200*a* of skirt system 200 includes a dorsal side skirt 202 pivotally secured to a side sill 11*b* of frame 11 via a pivot 204 (e.g., a hinge) that may include a first pivot arm 204*a* that is pivotally coupled to a second pivot arm 204*b*. First pivot arm 204*a* is secured to side sill 11*b* and a second pivot arm 204*b* secured to dorsal side skirt 202. Dorsal side skirt 202 includes an outer surface 202*a* and an inner surface 202*b*.

Skirt assembly 200*a* further includes a drive assembly 206. Driver assembly 206 has a first mounting portion 206*a* secured to bottom surface of side sill 11*b* and a second mounting portion 206*b* secured to inner surface 202*b* of dorsal side skirt 202. The first and second mounting portions 206*a*, 206*b* may include any suitable mechanical joining and/or uni/multi-axial pivoting structure such as a joint (e.g. hinge, ball and socket, pivot, etc., or combinations thereof), a bracket, a pin, etc., or combinations thereof. Driver assembly 206 further includes an arm assembly 208 that extends between first mounting portion 206*a* at one end of driver assembly 206 and a second mounting portion 206*b* at another end of driver assembly 206. Arm assembly 208 may be pivotably and/or multi-axially coupled to first and/or second mounting portions 206*a*, 206*b*. Driver assembly 206 is also coupled to controller 106*e* to selectively actuate arm assembly 206 between an unactuated position (FIG. 5A) and an actuated position (FIG. 5B). Arm assembly 208 includes a first arm 206*c* and a second arm 206*d* that moves relative to first arm 206*c*, as indicated by arrows "E," between a retracted position (FIG. 5A) and an extended position (FIG. 5B). Arm assembly 208 further includes, or is coupled to, a drive mechanism 210 having any suitable mechanical and/or electrical components that cooperate to facilitate movement of first and/or second arm 206*c*, 206*d* such as gears, threads, motors, teeth, pulleys, cables, etc., or combinations thereof (see, for example, cable 212 and pulley 214 illustrated in FIGS. 6A and 6B). In some embodiments, arm assembly 208 may be pneumatically and/or hydraulically actuated. In certain embodiments, arm assembly 208 may be a gas strut.

As driver assembly 206 moves from the unactuated position to the actuated position, second arm 206*d* extends outwardly to pivot dorsal side skirt 202 about pivot 204, as indicated by arrows "R," through pivot angle "α." Pivot angle "α" can be up to at least 90 degrees, and in some embodiments, greater than 90 degrees. As seen in FIG. 5A, dorsal side skirt 202 depends downwardly (e.g., perpendicular to side sill 11*b* of frame 11 or bottom surface of automobile 10) in the unactuated position and radially outwardly (e.g., in plane or parallel to side sill 11*b* of frame 11 or bottom surface of automobile 10) in the actuated position (e.g., fully actuated).

Figure 6A:
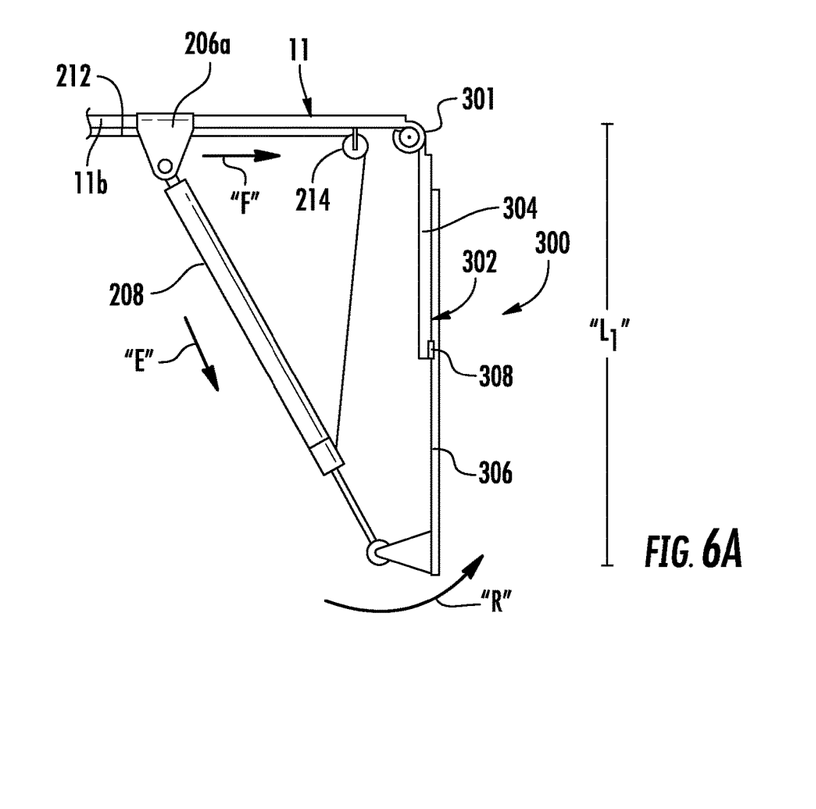
FIG. 6A is a front view of another embodiment of a skirt assembly in accordance with the present disclosure, the skirt assembly shown in a first position thereof.
Figure 6B:
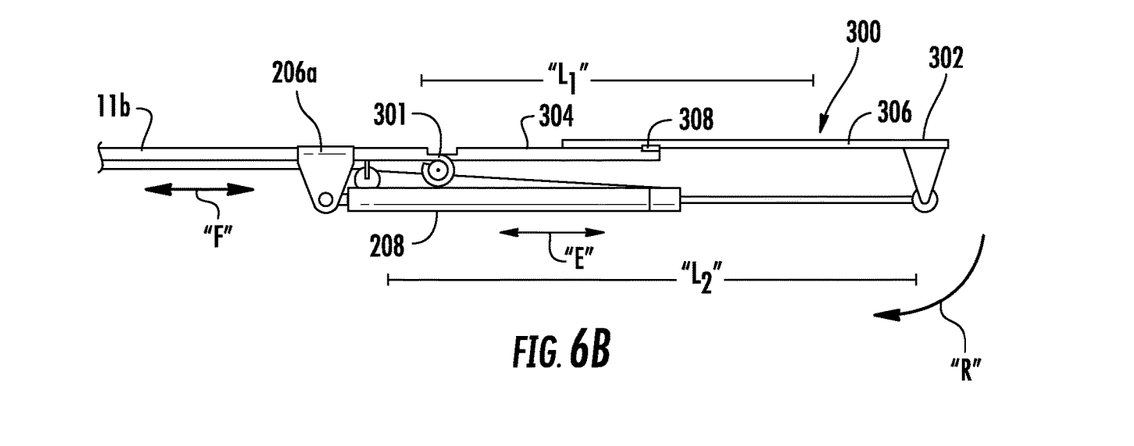
FIG. 6B is a front view of the skirt assembly of FIG. 6A, the skirt assembly shown in a second position thereof.

Turning now to FIG. 6A and FIG. 6B, one embodiment of a skirt assembly, generally referred to as skirt assembly 300, includes a dorsal side skirt 302 having a first panel 304 pivotably coupled to frame 11 on a first end portion of first panel 304 and second panel 306 slidably coupled to first panel 304 on an outer surface of first panel 304 via a slide mechanism 308 (e.g., slide joint or the like). Besides being able to pivot similar to dorsal side skirt 202, as indicated by arrows "R," this embodiment of skirt assembly 300 enables dorsal side skirt 302 to change lengths between unexpanded and expanded positions, for example, while positioned in plane with, or parallel to, side sill 11*b*, as indicated by lengths "L1" and "L2." The expanded position is illustrated in FIG. 6B where skirt assembly 300 is pivoted outwardly (e.g., 90 degrees via a pivot 301 that is integral with dorsal side skirt 302 and side sill 11*b*) and extended (length "L2"). The unexpanded position, not shown, is where skirt assembly 300 is pivoted outwardly (e.g., 90 degrees) and unextended (length "L1").

With continued reference to FIGS. 6A and 6B, first mounting portion 206*a* of driver assembly 206, in some embodiments, may be slidably secured to side sill 11*b* to enable first mounting portion 206*a* to translate (e.g., horizontally) relative to frame 11 for increasing an extension length of dorsal side skirt 202, as indicated by arrows "F."

Referring now to FIGS. 7A-7C and 8, another embodiment of a skirt assembly, generally referred to as skirt assembly 400, is substantially similar to skirt assembly 300 and generally includes a pivot 401 that is coupled (e.g., integrally) to a dorsal side skirt 403 defining a channel 403*a* through a first panel 405 of dorsal side skirt 403. A second panel 406 of dorsal side skirt 403 supports a guide arm 408 (e.g., a slide, protuberance, beam, etc.) that is slidably received in channel 403*a* of first panel 405 to enable second panel 406 to couple to first panel 405 and to enable second panel 406 to slidably translate relative to first panel 405.

Figure 7A:
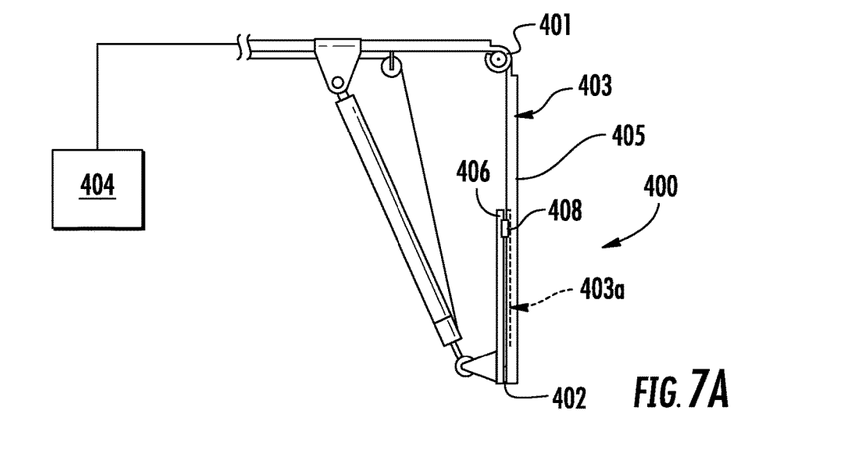
FIGS. 7A-7C are progressive views of still another embodiment of a skirt assembly in accordance with the present disclosure.
Figure 7B:
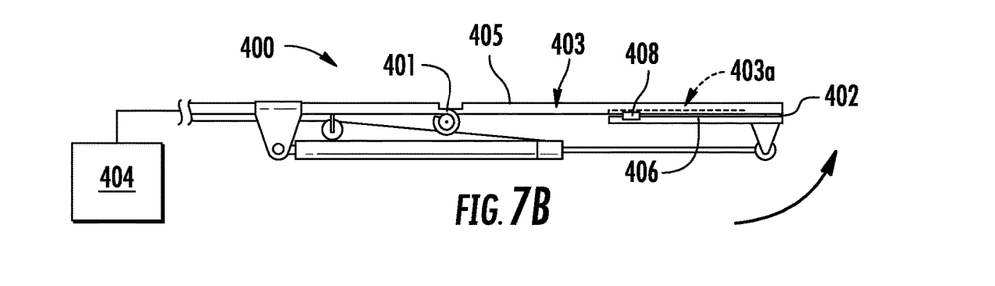
Figure 7C:
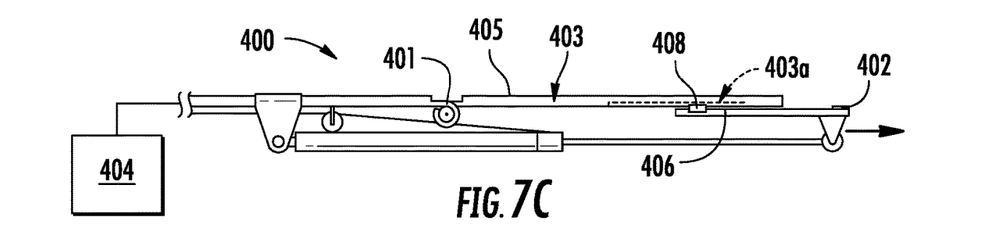
Figure 8:
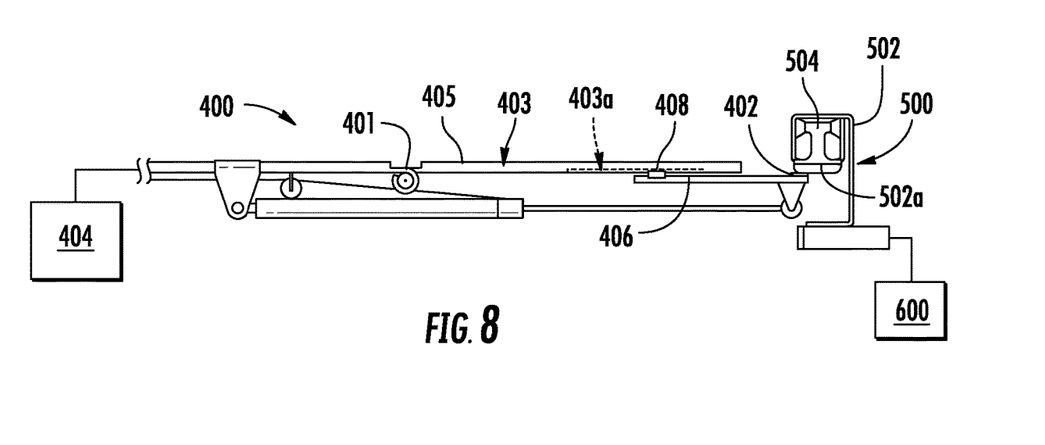
FIG. 8 is a side view illustrating the skirt assembly of FIGS. 7A-7C coupled to a charging port in accordance with the present disclosure.

Skirt assembly 400 further includes a charger (e.g., an electrical contact) 402 supported on a distal end portion of second panel 406. Charger 402 is disposed in electrical communication (e.g., via electrical wiring) with an energy storage device 404 (e.g., a battery) of automobile 10. Charger 402 is positioned to receive energy from an independent energy source 600 when charger 402 contacts an electrical charging station 500 in electrical communication with independent energy source 600 to charge energy storage device 404 of automobile 10. Electrical charging station 500 may be similar to a third rail for trains with a bottom contact. For instance, electrical charging contact 500 may include a mount 502 that supports a charging rail 504 such that charging rail 504 is essentially insulated (non-conductive material) by mount 502, or portions thereof, so that only a bottom surface 502*a* of charging rail 504 is exposed and positioned for electrical contact with charger 402. Skirt assembly 400 is positioned to prevent charger 402 from receiving electrical energy when second panel 406 is unextended and/or unactuated (see FIGS. 7A and 7B), but positioned to enable charger 402 to receive electrical energy when second panel 406 is extended (FIGS. 7C and 8).

Although the dorsal side skirts of the present disclosure are illustrated with flat configurations, the presently disclosed side skirts may have any suitable curve or shape to facilitate air flow. For instance, dorsal side skirts may include a propeller shape (e.g., with a curved scoop on the inner and/or outer surface of these dorsal side skirts.

Although the dorsal side skirts of the present disclosure are illustrated as unitary, the presently disclosed side skirts may be provided with separate segments that are independently and/or dependently actuatable (e.g., a first segment adjacent the front wheels on a first side of the automobile and a second segment adjacent the rear wheels on the first side of the automobile).

In some embodiments, the dorsal side skirts may be configured to move symmetrically and/or asymmetrically between raised and lowered positions. For instance, for sharp turns, the dorsal side skirts may be maneuvered asymmetrically to create torque from air flow turbulence. In certain embodiments, the opposing dorsal side skirts may be positioned differently (e.g., with different lengths and/or angles) to control air flow for preventing roll-over.

Any of the presently disclosed skirt systems and/or front quarter assemblies, or portions thereof, may be manually and/or autonomously actuated.

Any of the presently disclosed automobile skirt systems, or portions thereof, can be operatively coupled to a steering system 18 (FIG. 1A) to enable these skirt systems to autonomously cooperate as a user drives automobile 10. For instance, steering system 18 can cooperate with the skirt systems via a steering ratio of x:y, where x defines an amount of steering rotation and y defines an amount of skirt pivoting and/or extension. These ratios may change with differences in terrain, speed, temperature, tread wear, alignment, acceleration, braking, car tilt, stress, strain, fuel, weather, component or automobile health, etc., or combinations thereof. For example, while driving at about 50 miles per hour, the skirt assembly may pivot outwardly only 30 degrees around a flat turn to facilitate air flow about automobile 10, but pivot 60 degrees around a steep slope turn to help balance the automobile tilt and facilitate air flow about automobile 10.

In some embodiments, automobile 10 may include any suitable sensors (not shown) that are configured to cooperate with the automobile 10 and/or automobile systems of the present disclosure. For instance, such sensors may determine the speed, terrain, weather, etc. and communicate with the automobile systems to facilitate movement of the presently disclosed skirt assemblies and/or front quarter assemblies. Such sensors may include any suitable sensor such as an accelerometer, gyroscope, a diode, a camera, motion detector, proximity sensor, temperature sensor, etc., or combinations thereof.

Securement of any of the components of the presently described devices to any of the other components of the presently described devices can be effectuated using known securement techniques such welding (e.g., ultrasonic), crimping, gluing, fastening, interference-fit, snap-fit, etc., or combinations thereof.

Persons skilled in the art will understand that the structures and methods specifically described herein and shown in the accompanying figures are non-limiting exemplary embodiments, and that the description, disclosure, and figures should be construed merely as exemplary of particular embodiments. It is to be understood, therefore, that the present disclosure is not limited to the precise embodiments described, and that various other changes and modifications may be effected by one skilled in the art without departing from the scope or spirit of the disclosure. Additionally, the elements and features shown or described in connection with certain embodiments may be combined with the elements and features of certain other embodiments without departing from the scope of the present disclosure, and that such modifications and variations are also included within the scope of the present disclosure. Accordingly, the subject matter of the present disclosure is not limited by what has been particularly shown and described.

The invention claimed is:

1. A skirt system for an automobile, the automobile having a frame including a first side sill and a second side sill, the skirt system comprising:
   a first side skirt that couples to the first side sill of the automobile, the first side skirt selectively movable relative to the first side sill between a first position and a second position; and
   a driver assembly that couples to the frame of the automobile and to the first side skirt, the driver assembly actuatable to move the first side skirt between the first and second positions;
   wherein the first side skirt includes a plurality of panels;
   wherein the plurality of panels includes a first panel and a second panel that are coupled together, the second panel movable relative to the first panel to move the first side skirt between an unexpanded position and an expanded position, the first side skirt positioned to extend farther from the first side sill when the second panel is disposed in the expanded position; and
   wherein the second panel supports a charger that is configured to electrically couple to an energy storage device of the automobile.

2. The skirt system of claim 1, wherein the charger is positioned to receive energy from an independent energy source when the first side skirt is disposed in the expanded position and prevented from receiving energy from the independent energy source when the first side skirt is disposed in the unexpanded position.

* * * * *